W. J. JOHNSON.
Cotton-Choppers.

No. 147,844. Patented Feb. 24, 1874.

WITNESSES:

INVENTOR:
W. J. Johnson
BY
ATTORNEYS.

UNITED STATES PATENT OFFICE.

WILLIAM J. JOHNSON, OF SPRING PLACE, GEORGIA.

IMPROVEMENT IN COTTON-CHOPPERS.

Specification forming part of Letters Patent No. 147,844, dated February 24, 1874; application filed December 20, 1873.

*To all whom it may concern:*

Be it known that I, WILLIAM J. JOHNSON, of Spring Place, in the county of Murray and State of Georgia, have invented a new and useful Improvement in Cotton-Chopper; and I do hereby declare that the following is a full, clear, and exact description thereof, which will enable others skilled in the art to make and use the same, reference being had to the accompanying drawings forming part of this specification, in which—

Figure 1:
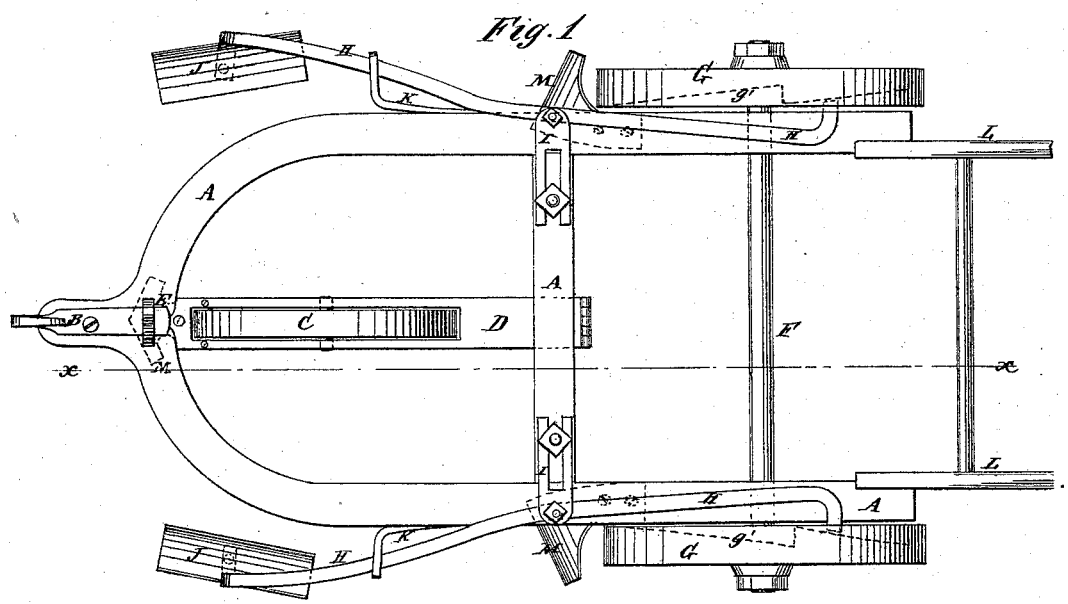
Figure 2:
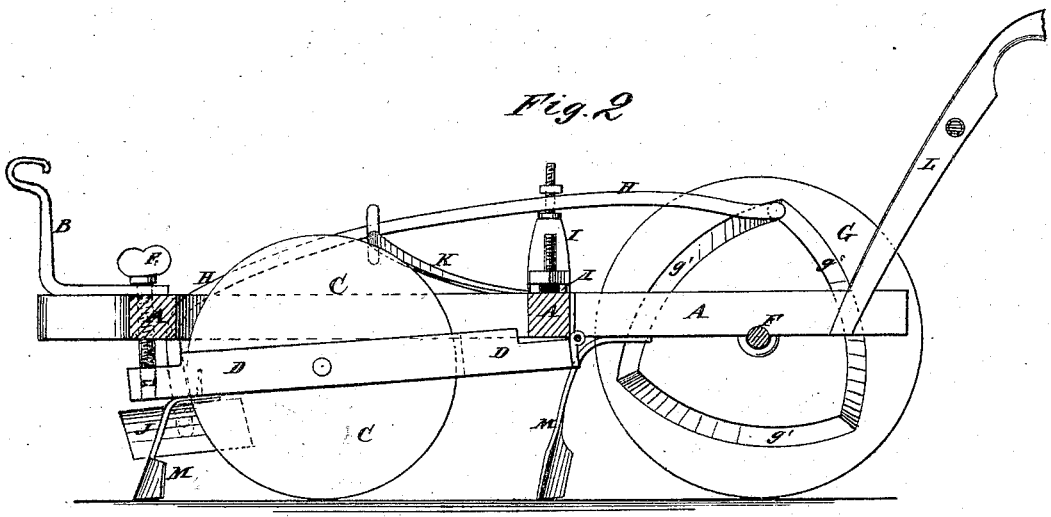

Figure 1 is a top or plan view of my improved machine. Fig. 2 is a vertical longitudinal section of the same taken through the line $x\ x$, Fig. 1.

Similar letters of reference indicate corresponding parts.

My invention has for its object to furnish an improved machine for chopping cotton to a stand, which shall be simple in construction, effective in operation, and easily adjusted, according to the height of the ridge and the width of the rows; and it consists in the construction and combination of the various parts of the machine, as hereinafter more fully described.

A is the frame of the machine, the forward parts of the side bars of which are curved inward, making the frame U-shaped. The side bars of the frame A are connected and held in their proper relative positions by a cross-bar, as shown in Figs. 1 and 2. To the forward end of the frame A is attached, or upon it is formed, a short bar or arm, to which is attached the draw-bar B. The forward part of the bar B projects upward, so that the point of draft attachment may be so high that the whiffle-tree will not strike the plants. C is a gage-wheel, which is pivoted in a slot in the beam D, the rear end of which is hinged to the middle part of the cross-bar of the frame A. The forward end of the beam D is connected with the forward end of the frame A by the screw E, which is swiveled to the frame A, and works in the forward end of the beam D, so that the forward end of the said frame A may be conveniently raised and lowered to adjust the cutters to the height of the ridge. F is the axle, which revolves in bearings attached to the rear part of the frame A, and to its ends are attached the wheels G. In the inner sides of the wheels G are formed grooves $g'$, arranged in the form of an equilateral triangle with curved sides, as shown in Fig. 2. The grooves $g'$ gradually increase in depth from angle to angle, so that there will be a shoulder at each angle of the groove. This form of the grooves $g'$ carries the cutters upward, outward, and again downward into position to make a level cut when the ends of the levers drop from the shoulders of the said grooves. H are the levers, the rear ends of which are bent outward at right angles to enter and work in the cam-grooves $g'$. The levers H are pivoted to standards I, the feet of which rest upon the frame A, and are slotted to receive the bolts that secure it to said frame A, so that by loosening the nuts of the bolts the standards I and levers H may be moved out and in to adjust the cutters according to the width of the rows of plants. To the forward ends of the levers H are attached the cutters or knives J by which the cotton is cut or chopped. K are springs, which may be flat or coiled, and which connect the forward parts of the levers H with the forward parts of the frame A, and which are so arranged as to draw the cutters J inward with a sharp and forcible blow to chop the cotton as soon as the rear ends of the levers H reach the shoulders of the grooves $g'$, the springs K, holding the ends of the levers all the time pressed against the bottoms of the grooves $g'$. The wheels G may be adjusted, as shown in the drawings, so that the cutters will both operate at the same time, or they may be adjusted to operate alternately, as may be desired. L are the handles, which are attached to the rear part of the frame A, and which are connected and held in their proper relative positions by a round, in the ordinary manner. M are scrapers placed in front of each of the wheels G G G, to scrape off any inequalities of surface in front of them, so that the machine may run steadily, and may operate more uniformly. The standards of the scrapers M are attached to the frame-work of the machine.

Having thus described my invention, I claim as new and desire to secure by Letters Patent—

The combination of the cutters J, levers H, springs K, or equivalent, adjustable pivoting-standards I, and cam-grooves $g'$, in combination with the wheels G and with the frame-work of the machine, substantially as herein shown and described, and for the purpose set forth.

WILLIAM J. JOHNSON.

Witnesses:
　JOHN I. JIBBS,
　JOHN G. MOORE.